US012591539B2

(12) United States Patent
Kitamura et al.

(10) Patent No.: US 12,591,539 B2
(45) Date of Patent: Mar. 31, 2026

(54) REARRANGING DATA AMONG PROCESSING ELEMENTS OF COMPUTATIONAL MEMORY

(71) Applicant: UNTETHER AI CORPORATION, Toronto (CA)

(72) Inventors: John Kitamura, Toronto (CA); Andrew Vincent Rock, Toronto (CA); William Martin Snelgrove, Toronto (CA)

(73) Assignee: UNTETHER AI CORPORATION, Toronto (CA)

( * ) Notice: Subject to any disclaimer, the term of this patent is extended or adjusted under 35 U.S.C. 154(b) by 0 days.

(21) Appl. No.: 18/424,143

(22) Filed: Jan. 26, 2024

(65) Prior Publication Data

US 2025/0245189 A1     Jul. 31, 2025

(51) Int. Cl.
G06F 15/80 (2006.01)
(52) U.S. Cl.
CPC ................................. G06F 15/8023 (2013.01)
(58) Field of Classification Search
None
See application file for complete search history.

(56) References Cited

U.S. PATENT DOCUMENTS 10,795,839 B1 * 10/2020 Ball ........................ G06F 13/20
10,872,057 B1 * 12/2020 Rawat ................ G06F 15/7807

| 11,150,995 | B1 * | 10/2021 | Dhoolam | ............ G06F 16/9535 |
| 2013/0120392 | A1 * | 5/2013 | Mech | ..................... G06T 11/001 |
| | | | | 345/441 |
| 2019/0005384 | A1 * | 1/2019 | Sundar | ................... G06N 3/084 |
| 2019/0228286 | A1 * | 7/2019 | Saito | ......................... G06N 3/08 |
| 2020/0104718 | A1 * | 4/2020 | Taba | ...................... G06N 3/045 |
| 2020/0160144 | A1 * | 5/2020 | Gutfreund | .............. G06N 3/082 |
| 2021/0081876 | A1 * | 3/2021 | Gardner | ................. G06Q 50/04 |
| 2021/0271965 | A1 * | 9/2021 | Malynin | ................. G06N 3/08 |
| 2021/0328597 | A1 * | 10/2021 | Kumar | .............. H03M 13/1105 |
| 2023/0088462 | A1 * | 3/2023 | Garrote | ................... G06F 16/36 |
| | | | | 717/126 |
| 2023/0160705 | A1 * | 5/2023 | Xu | ........................... G06N 5/04 |
| | | | | 701/533 |
| 2023/0393573 | A1 * | 12/2023 | de Peretti | ............. G06Q 50/40 |

* cited by examiner

*Primary Examiner* — Eric Coleman
(74) *Attorney, Agent, or Firm* — Perry + Currier

(57)     ABSTRACT

An array of interconnected processing elements is modelled as a graph of nodes. Each layer of the graph represents a possible arrangement of data elements within the array of interconnected processing elements. An edge between nodes of adjacent layers of the graph represents a movement of a data element between the nodes. Constraints are set for a starting arrangement of the data elements stored in the array, an ending arrangement of the data elements stored in the array, and a limit for each node of the graph to have one input edge from a previous layer and one output edge to a subsequent layer. The model and constraints are processed with an integer programming solver to obtain a program of movements of data elements among the interconnected processing elements. The program implements a rearrangement of the data elements from the starting arrangement to the ending arrangement.

12 Claims, 8 Drawing Sheets

REARRANGING DATA AMONG PROCESSING ELEMENTS OF COMPUTATIONAL MEMORY

BACKGROUND

The present disclosure relates to parallel processing computing systems, such as single instruction, multiple data (SIMD) processors.

Parallel processing computing systems have significant overhead in marshalling and arranging data. In order to perform complex, massively parallel operations, it is often required to spend a large number of computational cycles in getting data elements to specific processing elements, so that the operation may be performed successfully.

SUMMARY

According to various aspects of the present disclosure, an array of interconnected processing elements is modelled as a graph of nodes. Each layer of the graph represents a possible arrangement of data elements within the array of interconnected processing elements. An edge between nodes of adjacent layers of the graph represents a movement of a data element between the nodes. A first constraint is set as a starting arrangement of the data elements stored in the array of interconnected processing elements. A second constraint is set as an ending arrangement of the data elements stored in the array of interconnected processing elements. A third constraint is set to limit each node of the graph to have one input edge from a previous layer and one output edge to a subsequent layer. The model, the first constraint, the second constraint, and the third constraint are processed with an integer programming solver to obtain a program of movements of data elements among the interconnected processing elements. The program implements a rearrangement of the data elements from the starting arrangement to the ending arrangement. The program is stored for execution by a controller of the interconnected processing elements when the rearrangement is to be performed.

A number of layers may be selected for the graph. If the integer programming solver determines that the program is unattainable, then the number of layers for the graph may be increased and the process with the integer programming solver may be reperformed.

The number of layers may be selected based on a greatest distance among the interconnected processing elements of the array.

The number of layers may be selected based on a ratio of the greatest distance to a maximum possible movement distance among PEs.

An edge of the graph may include a number of channels that corresponds to a number of nodes in a layer. Each channel may be associated with a different interconnected processing element. A channel may be activated for an edge of a node to indicate a starting interconnected processing element for the data element stored in the node.

The array of interconnected processing elements may include a linear arrangement of processing elements.

The array of interconnected processing elements may include a two-dimensional arrangement of processing elements.

DETAILED DESCRIPTION

The present disclosure describes techniques to rearrange or shuffle data among processing elements (PEs) in a parallel processing architecture, such as single instruction, multiple data (SIMD) processor or computational memory, in which neighboring PEs are interconnected to share data. An array of PEs may contain data in a certain arrangement, and it may be desirable to rearrange the data to perform a computation. The techniques discussed herein assist in computing a program, also termed a sequence, of moves of data among interconnected PEs to realize the rearrangement in an efficient or optimal way. The number of processing cycles consumed in rearranging data may thus be reduced or minimized.

Figure 1:
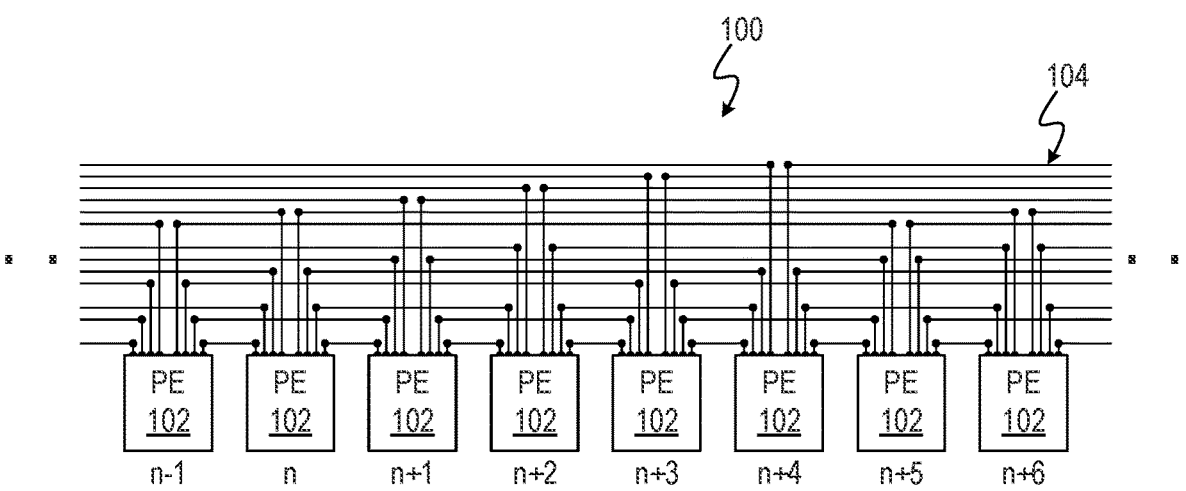
FIG. 1 is a diagram of an example array of interconnected processing elements.

FIG. 1 shows an example array 100 of interconnected processing elements 102, which may be physically arranged in a linear pattern (e.g., a physical row or column). Each PE 102 includes an arithmetic logic unit (ALU) to perform an operation, such as addition, multiplication, a multiplying accumulation, or similar. Each PE 102 has access to its own dedicated memory (not shown). The PEs 102 may be controlled in concert by a controller (not shown) to operate as a SIMD processor. Multiple arrays 100 may be provided to realize large-scale parallel processing.

The PEs 102 are mutually connected to share or communicate data. Interconnections 104 may be provided among the array 100 of PEs 102 to provide direct communication among neighboring PEs 102. It should be understood that "data" and "data element" as used herein may refer to data, instructions that operate on data, or both.

For example, a PE 102 (e.g., indicated as "n") may be connected to a first neighbor PE 102 (i.e., n+1) that is immediately adjacent the PE 102. Likewise, the PE 102 (n) may be further connected to a second neighbor PE 102 (n+2) that is immediately adjacent the first neighbor PE 102 (n+1). A plurality of PEs 102 may be connected to neighboring processing elements in the same relative manner, where n merely indicates an example PE 102 for explanatory purposes. That is, the first neighbor PE 102 (n+1) may be connected to its respective first and second neighbors (n+2 and n+3).

Interconnections may be bidirectional. For example, a given PE 102 (e.g., n+5) may also be connected to an opposite first neighbor PE 102 (n+4) that is immediately adjacent the PE 102 (n+5) on a side opposite the first neighbor PE 102 (n+6). Similarly, the PE 102 (n+5) may further be connected to an opposite second neighbor PE 102 (n+3) that is immediately adjacent the opposite first neighbor PE 102 (n+4).

FIG. 1 shows a given PE 102 being connected to its first, second, fourth, and sixth neighboring PEs in both directions. However, this is merely one example. In another example, a given PE 102 is connected to its first and second neighbor PEs in both directions. In still another example, a given PE 102 is connected to only its first neighbor PE in both directions.

Any suitable number of PEs 102 may be connected to neighboring PEs in the above manner. PEs 102 at and near the ends of the array 100 may omit certain connections by virtue of the array 100 terminating. For example, an endmost PE 102 only connects to PEs in one direction.

Figure 2A:
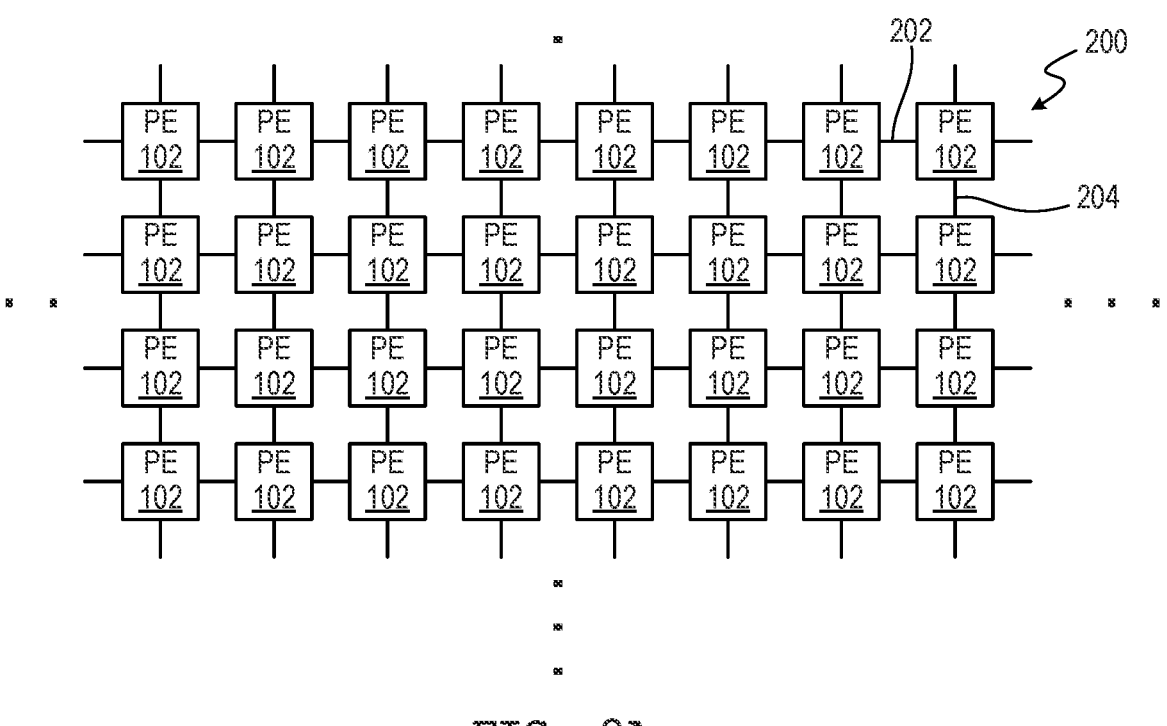
FIG. 2A is a diagram of an example multidimensional array of interconnected processing elements.

As shown in FIG. 2A, in various examples, an array 200 of PEs 102 may be multidimensional. Interconnections 202, 204 may be provided in more than one dimension (e.g., rows and columns). Interconnections in different dimensions may be the same or different. That is, interconnections 202 in one direction may connect a PE 102 to a certain subset of neighbor PEs in that direction, while interconnections 204 in another direction may connect the same PE 102 to another subset of neighbor PEs in that other direction. For example, with a two-dimensional array of PEs, interconnections 202 in a first direction (e.g., along a row) connect each PE 102 to respective first and second neighbor PEs in both directions (e.g., left and right), while interconnections 204 in a second direction (e.g., along a column) connect each PE 102 to respective first neighbor PEs in both directions (e.g., up and down).

Note that in FIG. 2A the interconnections 202, 204 are shown as simplified. It should be understood that the interconnections 202, 204 may be implemented as shown in FIG. 1.

Figure 2B:
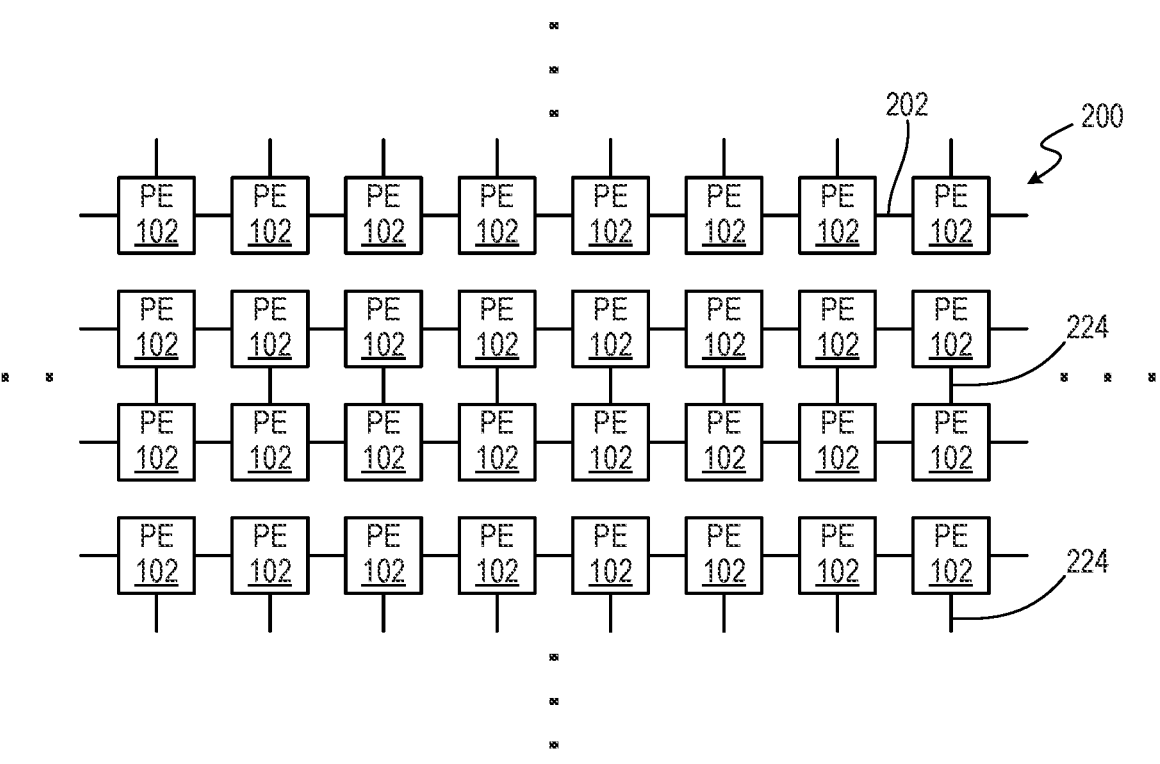
FIG. 2B is a diagram of an example irregular multidimensional array of interconnected processing elements.

Referring to FIG. 2B, a multidimensional array 220 may have irregular interconnections 202, 224. In the example shown, interconnections 202 in a first direction (e.g., along a row) connect each PE 102 to respective first and second neighbor PEs in both directions (e.g., left and right), while interconnections 204 in a second direction (e.g., along a column) connect each PE 102 to respective first neighbor PEs in one direction (e.g., up or down) depending on the row. That is, paired rows of PEs may have interconnections 224 in the column direction.

It should be noted that directions/dimensions expressed or implied, such as left, right, up, down, row, column, etc. are used for explanatory purposes only and do not limit the techniques discussed herein. It should be understood that directional/dimensional language is relative to a frame of reference, which may be variable or undefined. In addition, the arrangements of PEs discussed herein are logical in nature and the physical layout on silicon may differ.

Figure 3:
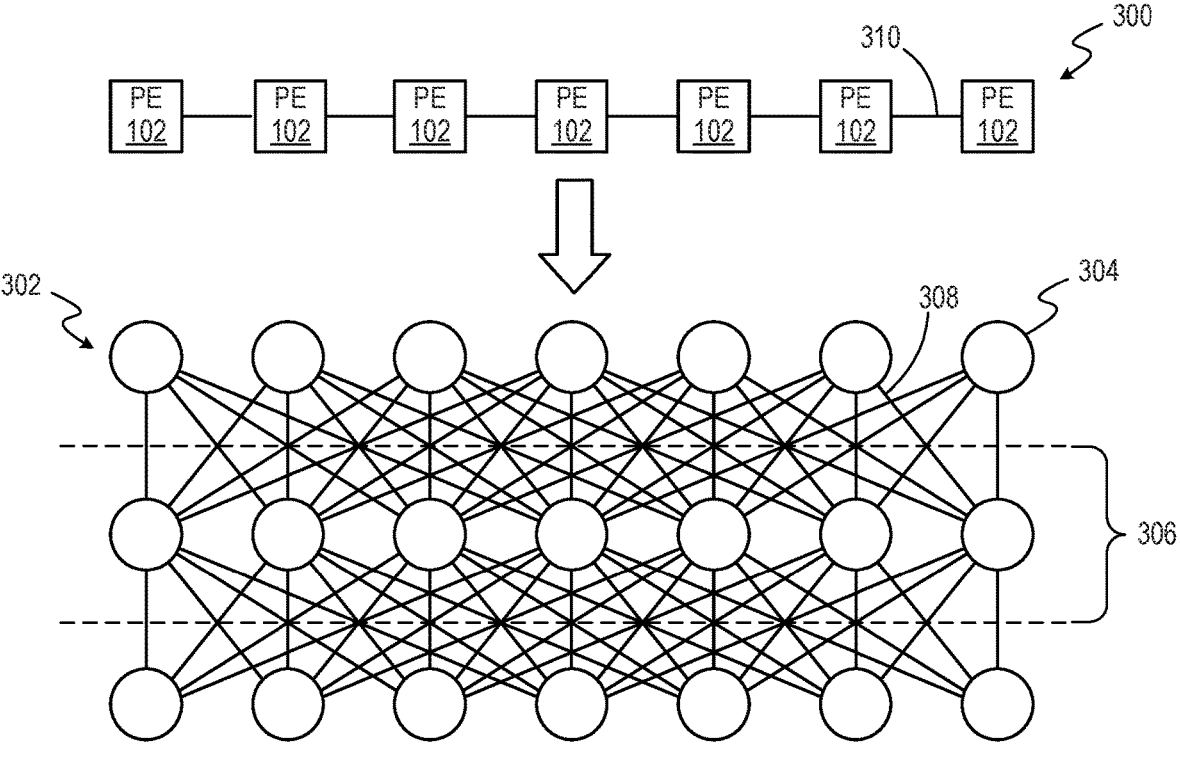
FIG. 3 is a diagram of an example array of interconnected processing elements modelled as a graph of nodes and edges.

FIG. 3 shows an array 300 of interconnected PEs 102 modelled as a graph 302 of nodes 304. In this example, seven PEs 102 are modelled for sake of explanation. It is contemplated that any number of PEs 102 may be modelled in this way. In this example, each PE 102 has interconnections 310 allowing the sharing data with its immediate three neighbor PEs. In other examples, other interconnections may be used and modelled.

The graph 302 is a rectangular grid of nodes 304. Each layer 306 of the graph 302 represents a possible arrangement of data elements within the array 300 of PEs 102. Within each layer 306, each node represents a PE 102. Edges 308 in a given layer 306 connect nodes 304 to nodes 304 in the next layer 306. Each edge 308 between nodes 304 of adjacent layers represents a possible movement of a data element, including holding or no movement, between PEs 102 represented by the nodes 304. First (top) and last (bottom) layers represent starting and ending arrangements and thus have a reduced number of edges 308.

The number of layers 306 is variable and may be based on the greatest distance among PEs 102. The greatest distance among PEs in this example is six (i.e., number of PEs minus one). Further, the number movements and thus the number of layers 306 in addition to the starting layer may be expected to be about equal to the ratio of the greatest distance to the maximum possible movement distance between PEs. In this example, the maximum possible movement distance is three as determined by the interconnections 310 of the PEs 102, so the ratio results in two (i.e., 6/3). As such, two movements and thus two layers not counting the starting layer, i.e., three layers total, is a useful estimate of the number of layers required for the graph 302.

Figure 4:
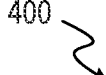
FIG. 4 is a diagram of an example program of movements that rearranges data elements in the array of FIG. 3, as modelled by a graph, from a starting arrangement to an ending arrangement.
Figure 4:
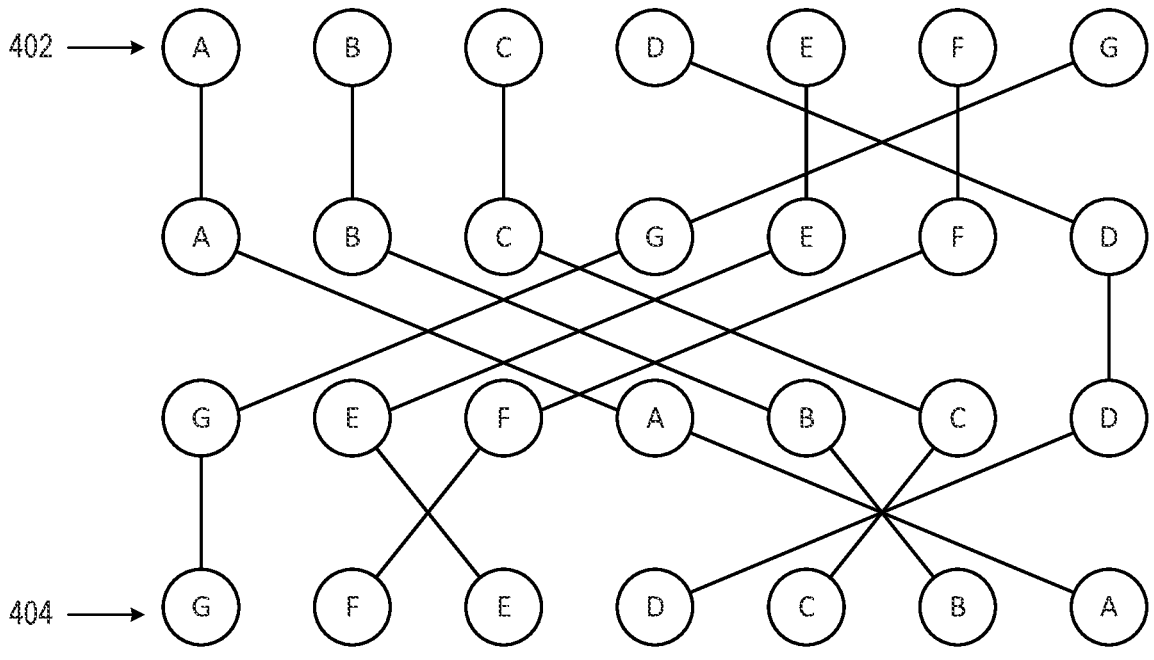

FIG. 4 shows an example sequence of movements 400 that rearranges data elements in the array 300, as modelled by the graph 302 (see FIG. 3), from a starting arrangement 402 to an ending arrangement 404. As can be seen, data elements A through G are reversed from a starting arrangement 402 at a starting layer of A B C D E F G to an ending arrangement 404 at an ending layer of G FED CB A. A total of four layers, including the starting layer, are used in this example. Examples such as this one can be solved by inspection. However, inspection may not arrive at an optimal or even efficient solution. In addition, full scale PE arrays may have many more PEs (e.g., 64, 96, 128 or more) that makes human analysis highly inefficient or impossible, and analyzing various examples does provide a general solution that can be used after deployment of the device carrying the array of PEs.

Figure 5:
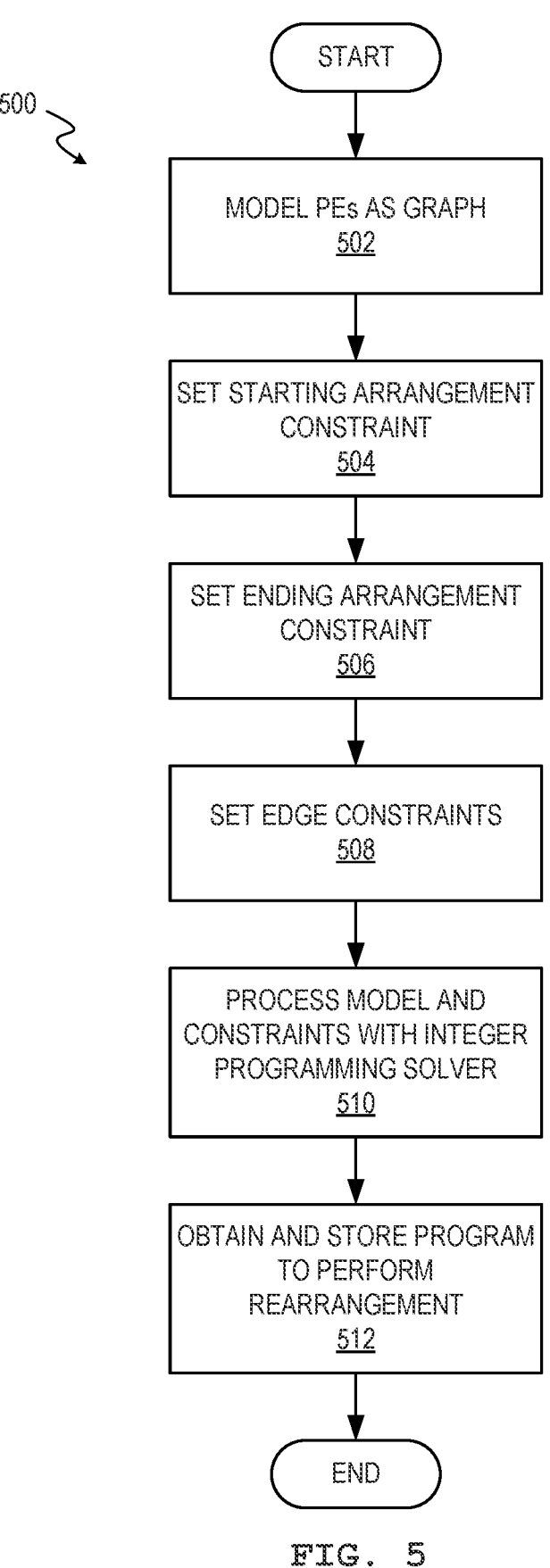
FIG. 5 is a flowchart of an example process for determining a program of moves to perform a rearrangement of data elements.

FIG. 5 shows an example process 500 for determining a program of moves to perform a rearrangement of data elements. The process 500 may be implemented by processor-executable instructions stored at a non-transitory machine-readable medium, such as at a compiler that compiles code for the array of PEs to execute.

At block 502, a graph that models an array of interconnected PEs is generated. The graph may be configured with a number of layers expected to be the maximum required to achieve all the movements required. As discussed above, each layer models a possible arrangement of data within the PEs, each PE is modelled by a node in each layer, and edges between the PEs model possible movements of data therebetween.

At block 504, a first constraint is set as a starting arrangement of data elements stored in the array of interconnected PEs.

At block 506, a second constraint is set as an ending arrangement of the data elements stored in the array of interconnected PEs.

At block 508, a third constraint is set to limit each node of the graph to have one input edge from a previous layer and one output edge to a subsequent layer.

The constraints discussed above may be expressed mathematically as shown below, in which $X_{e,c}$ is 1 if edge e carries data from processing element c:

$$\forall_c \, \forall_{uv} \, \in E_1, x_{uv,c} = \begin{cases} 1, & u = c \\ 0, & u \neq c \end{cases}$$

$$\forall_c \, \forall_{uv} \, \in E_R, x_{uv,c} = \begin{cases} 1, & v = perm(c) \\ 0, & v \neq perm(c) \end{cases}$$

$$\forall_i \, \forall_c, \sum_{e \in E_i} x_{e,c} = 1$$

$$\forall_i \, \forall_c \, \forall_v, \sum_{uv \in E_i} x_{uv,c} = \sum_{vw \in E_{i+1}} x_{vw,c}$$

For each row i, there is a set of edges Ei. Each such edge is represented as uv,c, such that u at time i is connected to v at time i+, carrying data from processing element c. The term perm(c) is the destination processing element at which data that started at processing element c should occupy at the end of the rearrangement. For example, to reverse a processing element row of length three, perm(1)=3, perm(2)=2, and perm(3)=1.

At block 510, the model, the first constraint, the second constraint, and the third constraint are processed by an integer programming solver to obtain a program of movements of data elements among the interconnected PEs.

An example of a suitable integer programming solver is OR-Tools™ published by Google™.

The program implements a rearrangement of the data elements from the starting arrangement to the ending arrangement.

At block 512, the program is stored for execution by a controller of the interconnected PEs when the rearrangement is to be performed. The program may be a function, subroutine, or other code element of a larger program that executes a desired functionality.

The process 500 is illustrative. In various implementations it may be useful during solving (block 508) to have information concerning the history of the data elements as they traverse the graph. The history of a data element includes, as a minimum, identification of the origin node, and may further include identification of any or all of the intermediate nodes. That is, when a subsequent node is considered as a candidate to receive data from a previous node, it may be useful for the integer programming solver to be aware of the origin node of the data. Not only may this be helpful to efficiently evaluate candidate moves, this may also be useful for the solver to know when the ending arrangement has been obtained.

Figures 6A, 6B:
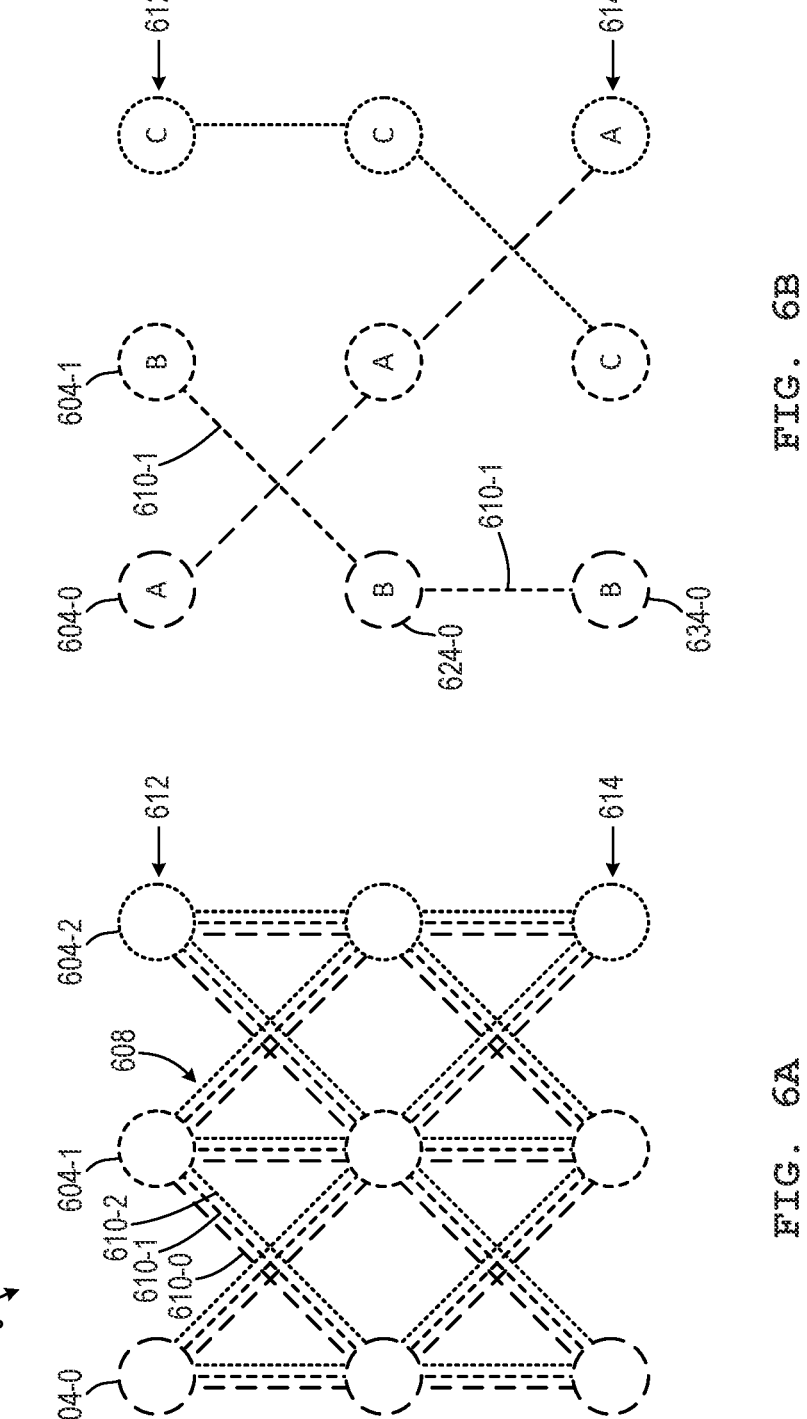
FIG. 6A is a diagram of another example array of interconnected processing elements modelled as a graph of nodes and edges with channels.
FIG. 6B is a diagram of an example program of movements that rearranges data elements in the array of FIG. 6A.

FIG. 6A shows another array of PEs modelled as a graph 602 of nodes 604-0, 604-1, 604-2 and edges 608 with channels 610-0, 610-1, 610-2. Note that associated nodes and channels are illustrated with the same style of dashed line. FIG. 3 and related description may be referenced for details not repeated here. The array modelled is an array with three PEs with interconnections that allow the sharing of data with an immediately adjacent PE.

Each layer of the graph 602 represents a possible arrangement of data elements within the array of PEs. Each edge 608 between nodes 604-0, 604-1, 604-2 of adjacent layers represents a possible movement of a data element. Each edge 608 includes a number of channels 610-0, 610-1, 610-2, and each channel 610-0, 610-1, 610-2 is associated with a different node 604-0, 604-1, 604-2 in the starting layer 612. A particular channel 610-0, 610-1, 610-2 is activated for an edge 608 to indicate a starting node 604-0,

604-1, 604-2 (starting PE 102) for the data element stored in the node 604-0, 604-1, 604-2.

As shown in FIG. 6B, for example, if data is to be moved from a starting PE modelled in the starting layer 612 by node 604-1 to another PE modelled in the starting layer 612 as node 604-0 and in the ending layer 614 as node 634-0, the channel 610-1 associated with the starting node 604-1 is used. When an intermediate node 624-0 receives data on channel 610-1, the node 624-0 knows that this data was received from the starting node 604-1. When this intermediate node 624-0 is to move data to the node 634-0 in the ending layer 614, the node 624-0 also uses channel 610-1, so that node 634-0 knows the origin of this data to be node 604-1. Thus, the ending arrangement is reached when the nodes receive data on the channels that define the ending arrangement.

The model defined by the graph 602 may be provided to the process 500 to solve for the program that obtains a desired rearrangement of data elements, as discussed above.

The process 500 of FIG. 5 assumes that a suitable graph is generated. If the number of layers is too few, then the integer programming solver may not be able to determine a solution and process 500 may have to be repeated with a larger number of layers.

Figure 7:
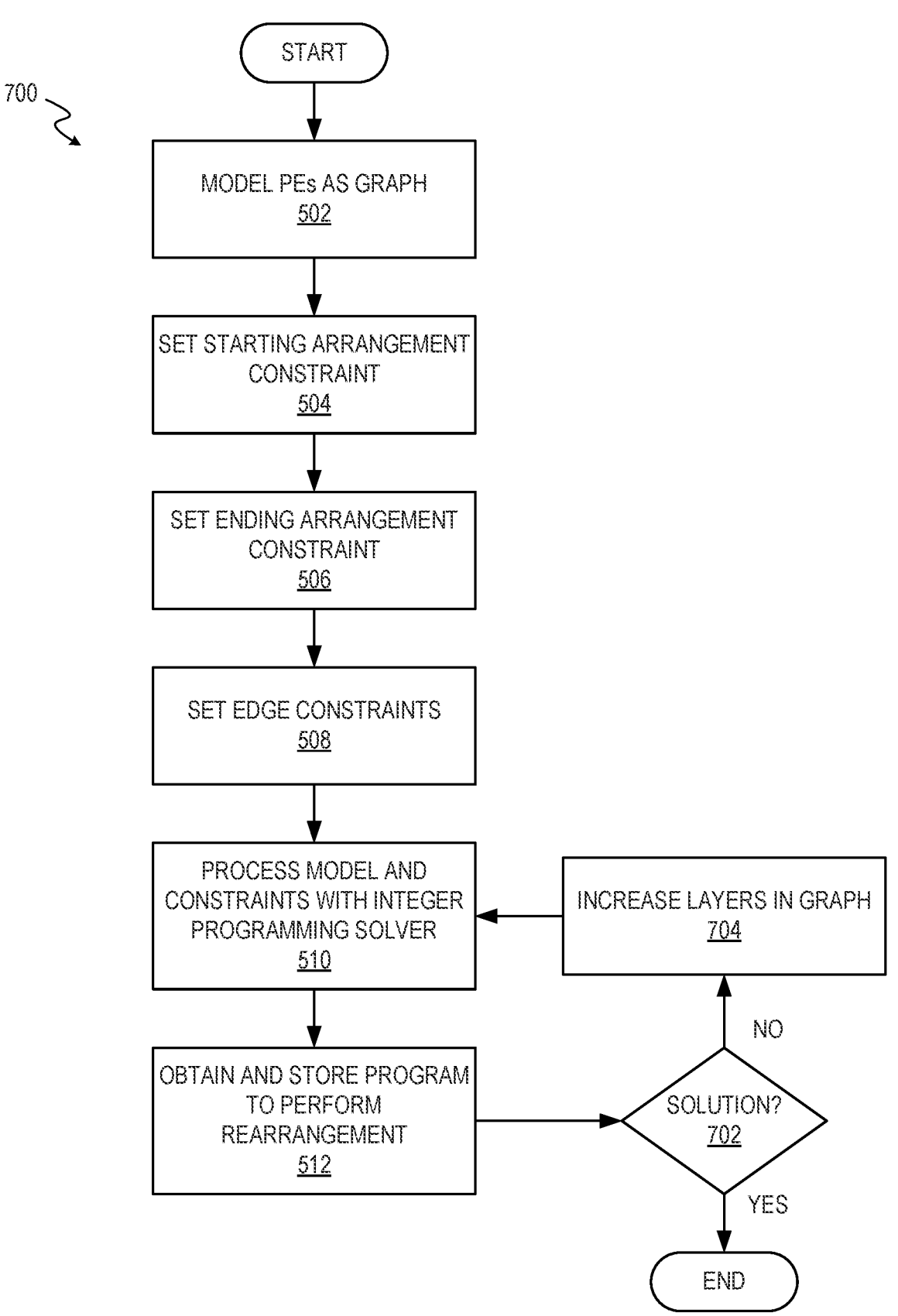
FIG. 7 is a flowchart of an example process for determining a program of moves to perform a rearrangement of data elements with a graph having a variable number of layers.

FIG. 7 shows an example process 700 for determining a program of moves to perform a rearrangement of data elements with a graph having a variable number of layers. The process 700 may be implemented by processor-executable instructions stored at a non-transitory machine-readable medium, such as at a compiler that compiles code for the array of PEs to execute. As will be discussed, the graph dynamically adjusts the number of layers until a solution is reached. The process 500 of FIG. 5 may be referenced for details not repeated here.

At block 502, a graph that models an array of interconnected PEs is generated. As discussed above, each layer models a possible arrangement of data within the PEs, each PE is modelled by a node in each layer, and edges between the PEs model possible movements of data therebetween.

The graph may be initially configured with a suitable number of layers. The initial number of layers may be based on the greatest distance among PEs and the maximum possible movement distance between PEs. An example of a suitable initial number of layers, in addition to the starting layer, is equal to the ratio of the greatest distance between PEs to the maximum possible movement distance between PEs.

At block 504, a first constraint is set as a starting arrangement of data elements stored in the array of interconnected PEs.

At block 506, a second constraint is set as an ending arrangement of the data elements stored in the array of interconnected PEs.

At block 508, a third constraint is set to limit each node of the graph to have at most one input edge from a previous layer and at most one output edge to a subsequent layer.

At block 510, the model, the first constraint, the second constraint, and the third constraint are processed by an integer programming solver to attempt to obtain a program of movements of data elements among the interconnected PEs.

At block 702, if a program is attained, then, at block 512, the program is stored for execution by a controller of the interconnected PEs when the rearrangement is to be performed. The program may be a function, subroutine, or other code element of a larger program that executes a desired functionality.

If the integer programming solver determines that the program is unattainable, then, at block 704, the number of layers for the graph is increased. The increase may be a set amount, such as one or two layers. The process 700 then returns to block 510 for another attempt to attain the program.

Figure 8:
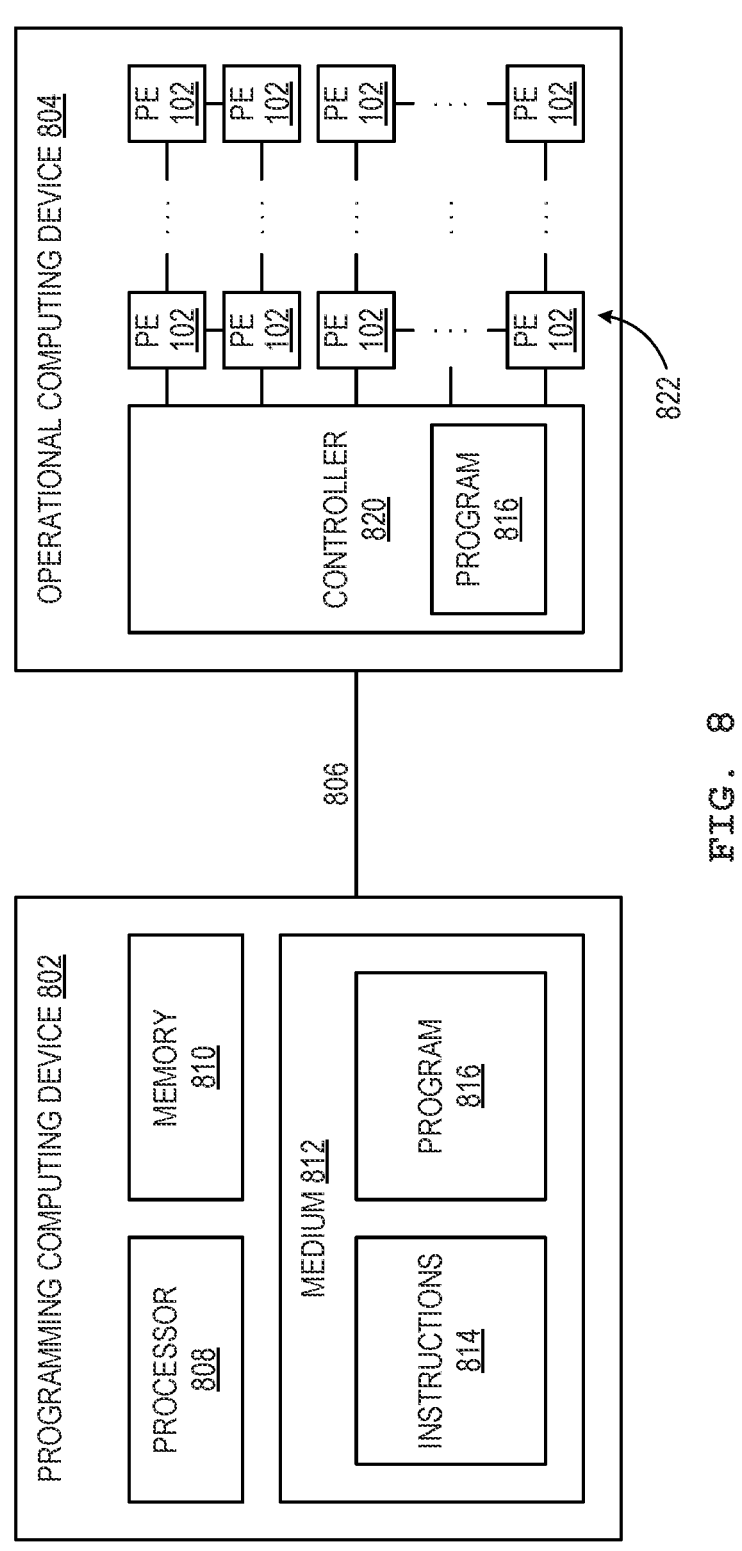
FIG. 8 is a block diagram of a system that implements a process for determining a program of moves for a rearrangement of data elements in a computing device that includes an array of interconnected processing elements.

FIG. 8 shows an example system 800 that implements the techniques discussed above.

The system 800 includes a programming computing device 802 and an operational computing device 804. The operational computing device 804 carries out arbitrary desired functionality. The programming computing device 802 configures the operational computing device 804 with suitable software to carry out the desired functionality. The operational computing device 804 may be connected to the programming computing device 802 via a data communications link 806, which may include a serial port, network adaptor, or similar component at each of the devices 802, 804.

In various examples, various network-connected programming computing devices 802 may carry out the functions attributed herein to the programming computing device 802.

The programming computing device 802 includes a processor 808, memory 810, a non-transitory machine-readable medium 812, and instructions 814 stored in the medium.

The processor 808 may include a central processing unit (CPU), a microprocessor, a processing core, a field-programmable gate array (FPGA), an application-specific integrated circuit (ASIC), or a similar device capable of executing the instructions. The processor may be embodied as one or more processors that collectively execute instructions. When multiple processors are used, one processor may execute some instructions and another processor may execute other, cooperating instructions.

The memory 810 may be random-access memory (RAM) or other volatile memory.

The non-transitory machine-readable medium 812 may include an electronic, magnetic, optical, or other type of non-volatile physical storage device that encodes the instructions 814. Examples of such storage devices include a non-transitory machine-readable medium such as a hard drive (HD), solid-state drive (SSD), read-only memory (ROM), electrically-erasable programmable read-only memory (EEPROM), or flash memory.

The instructions 814 may be directly executed, such as binary or machine code, and/or may include interpretable code, bytecode, source code, or similar instructions that may undergo additional processing to be executed. All of such examples may be considered executable instructions.

The instructions 814 may implement features such as an integrated development environment (IDE), code repository, code library, compiler, and other programming functionality. The instructions 814 further implement a process for determining a program 816 of moves to perform a rearrangement of data elements in an array of PEs, such as the process 500 or 700 discussed above. This process may be part of a compiler.

The operational computing device 804 includes a controller 820 and array 822 of interconnected PEs 102, examples of which are discussed above. The controller 820 controls the connected array 822 of PEs 102 to perform parallel or SIMD operations. The operational computing device 804 may include multiple controllers 820 each in control of one or multiple arrays 822 of PEs 102. Any suitable hierarchy of controllers 820 and PE arrays 822 may be implemented.

The programming computing device 802 may generate and compile the program 816, alone or as part of a larger program, and load the program into the controller 820 of the operational computing device 804. Subsequently, when the operational computing device 804 is to rearrange data among PEs 102 of an array 822, the controller 820 may execute the program 816 to perform the rearrangement.

In view of the above, it should be understood that the techniques discussed herein assist in computing a program or sequence of movements (shuffling) of data among interconnected PEs to realize a desired arrangement in an efficient or optimal way. The number of processing cycles consumed in rearranging (shuffling) data may thus be reduced or minimized, thereby freeing cycles to perform desired computations and increasing the overall computational efficiency of a computing device.

We claim:

1. A non-transitory machine-readable medium comprising instructions that, when executed by a processor, cause the processor to:

model an array of interconnected processing elements as a graph of nodes, wherein each layer of the graph represents a possible arrangement of data elements within the array of interconnected processing elements, and wherein an edge between nodes of adjacent layers of the graph represents a movement of a data element between the nodes;

set a first constraint as a starting arrangement of the data elements stored in the array of interconnected processing elements;

set a second constraint as an ending arrangement of the data elements stored in the array of interconnected processing elements;

set a third constraint to limit each node of the graph to have one input edge from a previous layer and one output edge to a subsequent layer;

select a number of layers for the graph based on a ratio of a greatest distance among the interconnected processing elements of the array to a maximum possible movement distance among PEs;

process the model, the first constraint, the second constraint, and the third constraint with an integer programming solver to obtain a program of movements of data elements among the interconnected processing elements, wherein the program implements a rearrangement of the data elements from the starting arrangement to the ending arrangement;

if the integer programming solver determines that the program is unattainable in the selected number of layers, then increase the number of layers for the graph and reperform the process with the integer programming solver; and store the program for execution by a controller of the interconnected processing elements when the rearrangement is to be performed.

2. The non-transitory machine-readable medium of claim 1, wherein:

an edge of the graph includes a number of channels that corresponds to a number of nodes in a layer;

each channel is associated with a different interconnected processing element; and a channel is activated for an edge of a node to indicate a starting interconnected processing element for the data element stored in the node.

3. The non-transitory machine-readable medium of claim 1, wherein the array of interconnected processing elements comprises a linear arrangement of processing elements.

4. The non-transitory machine-readable medium of claim 1, wherein the array of interconnected processing elements comprises a two-dimensional arrangement of processing elements.

5. A computing system comprising:

one or more processors configured to collectively:

model an array of interconnected processing elements as a graph of nodes, wherein each layer of the graph represents a possible arrangement of data elements within the array of interconnected processing elements, and wherein an edge between nodes of adjacent layers of the graph represents a movement of a data element between the nodes;

set a first constraint as a starting arrangement of the data elements stored in the array of interconnected processing elements;

set a second constraint as an ending arrangement of the data elements stored in the array of interconnected processing elements;

set a third constraint to limit each node of the graph to have one input edge from a previous layer and one output edge to a subsequent layer;

select a number of layers for the graph based on a ratio of a greatest distance among the interconnected processing elements of the array to a maximum possible movement distance among PEs;

process the model, the first constraint, the second constraint, and the third constraint with an integer programming solver to obtain a program of movements of data elements among the interconnected processing elements, wherein the program implements a rearrangement of the data elements from the starting arrangement to the ending arrangement;

if the integer programming solver determines that the program is unattainable in the selected number of layers, then increase the number of layers for the graph and reperform the process with the integer programming solver; and store the program for execution by a controller of the interconnected processing elements when the rearrangement is to be performed.

6. The computing system of claim 5, wherein:

an edge of the graph includes a number of channels that corresponds to a number of nodes in a layer;

each channel is associated with a different interconnected processing element; and a channel is activated for an edge of a node to indicate a starting interconnected processing element for the data element stored in the node.

7. The computing system of claim 5, wherein the array of interconnected processing elements comprises a linear arrangement of processing elements.

8. The computing system of claim 5, wherein the array of interconnected processing elements comprises a two-dimensional arrangement of processing elements.

9. A method comprising modelling an array of interconnected processing elements as a graph of nodes, wherein each layer of the graph represents a possible arrangement of data elements within the array of interconnected processing elements, and wherein an edge between nodes of adjacent layers of the graph represents a movement of a data element between the nodes;

setting a first constraint as a starting arrangement of the data elements stored in the array of interconnected processing elements;

setting a second constraint as an ending arrangement of the data elements stored in the array of interconnected processing elements;

setting a third constraint to limit each node of the graph to have one input edge from a previous layer and one output edge to a subsequent layer;

selecting a number of layers for the graph based on a ratio of a greatest distance among the interconnected processing elements of the array to a maximum possible movement distance among PEs;

processing the model, the first constraint, the second constraint, and the third constraint with an integer programming solver to obtain a program of movements of data elements among the interconnected processing elements, wherein the program implements a rearrangement of the data elements from the starting arrangement to the ending arrangement;

if the integer programming solver determines that the program is unattainable in the selected number of layers, then increasing the number of layers for the graph and reperforming the processing with the integer programming solver; and storing the program for execution by a controller of the interconnected processing elements when the rearrangement is to be performed.

10. The method of claim 9, wherein:

an edge of the graph includes a number of channels that corresponds to a number of nodes in a layer;

each channel is associated with a different interconnected processing element; and a channel is activated for an edge of a node to indicate a starting interconnected processing element for the data element stored in the node.

11. The method of claim 2, wherein the array of interconnected processing elements comprises a linear arrangement of processing elements.

12. The method of claim 2, wherein the array of interconnected processing elements comprises a two-dimensional arrangement of processing elements.

* * * * *